No. 748,149. PATENTED DEC. 29, 1903.
M. H. BAKER.
REGULATING DEVICE FOR ELECTRIC CIRCUITS.
APPLICATION FILED DEC. 8, 1902.
NO MODEL. 2 SHEETS—SHEET 1.
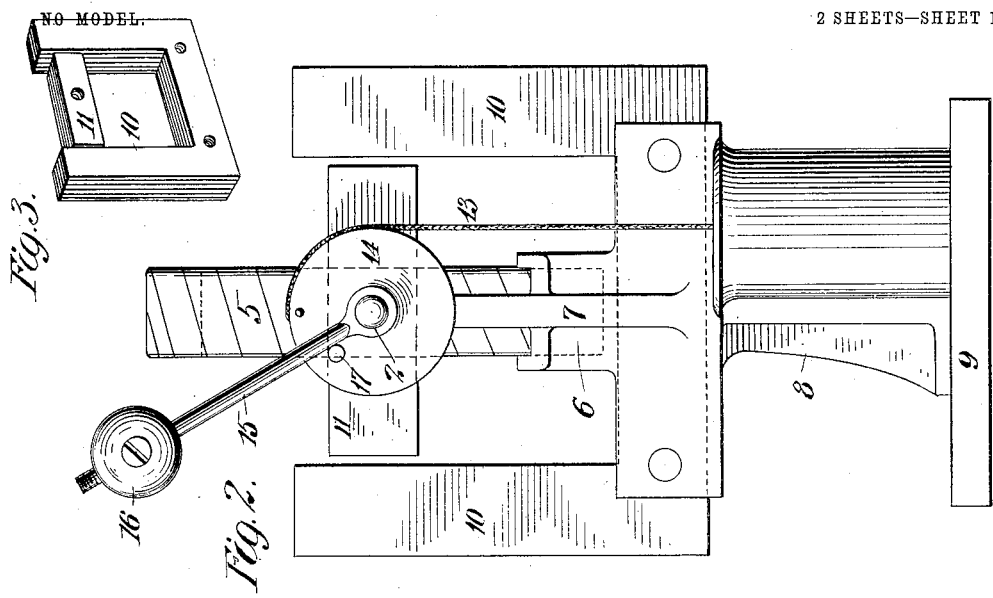
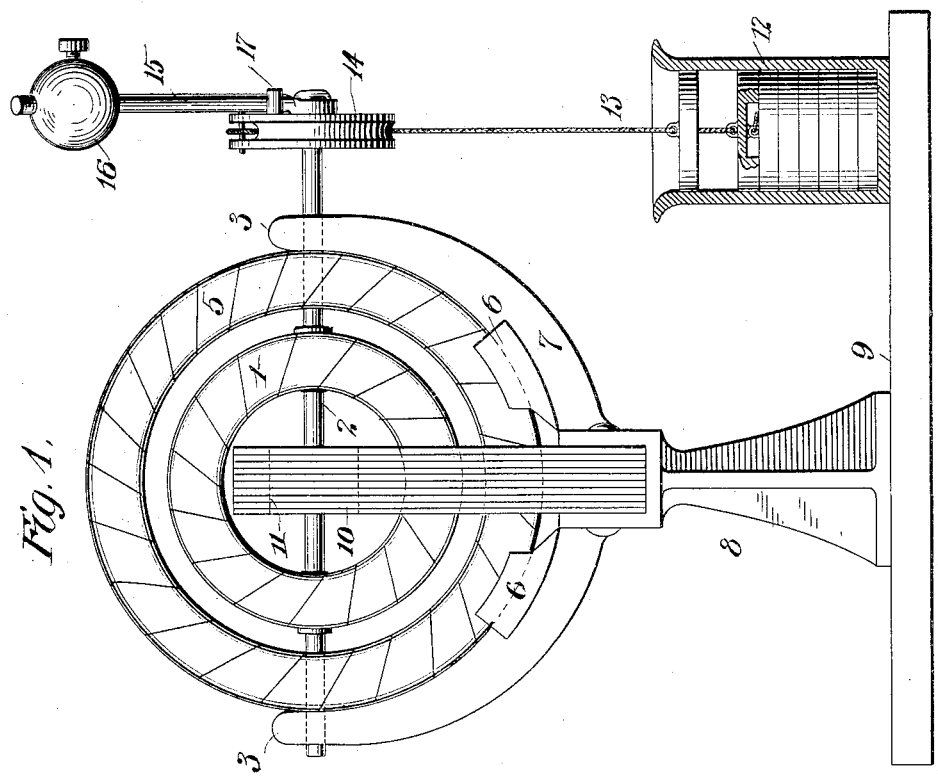
Witnesses
Frank S. Ober
Wm. H. Capel
Inventor
Malcolm H. Baker
By his Attorney
George W. Stockbridge

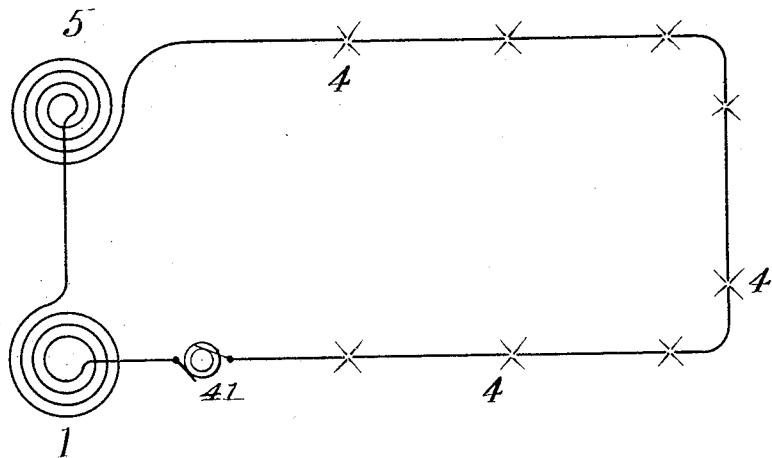

No. 748,149. Patented December 29, 1903.

UNITED STATES PATENT OFFICE.

MALCOLM H. BAKER, OF NEW YORK, N. Y., ASSIGNOR TO WESTINGHOUSE ELECTRIC & MANUFACTURING COMPANY, A CORPORATION OF PENNSYLVANIA.

REGULATING DEVICE FOR ELECTRIC CIRCUITS.

SPECIFICATION forming part of Letters Patent No. 748,149, dated December 29, 1903.

Application filed December 8, 1902. Serial No. 134,380. (No model.)

*To all whom it may concern:*

Be it known that I, MALCOLM H. BAKER, a citizen of the United States, and a resident of New York, in the county of New York and State of New York, have invented certain new and useful Improvements in Regulating Devices for Electric Circuits, of which the following is a specification.

I have already patented a number of devices for regulating electric circuits in which translating devices, such as arc-lamps, for example, are arranged in series. Several such patents were issued to me on October 8, 1901.

The present application is intended to disclose still other means for so controlling an electric circuit of the kind described as to maintain the current in the circuit practically constant.

The feature on which the various devices mentioned depended for the regulation of the circuit was that of varying the choking effect of a reactance device so as to compensate for changes of resistance in the circuit. The accuracy of the control depended upon the employment of a mechanical force so acting upon the reactance device through a movable part thereof as to produce the necessary regulation.

In the present apparatus the circuit is controlled electrically by means of two coils or windings, one of which is movable with relation to the other, both windings standing in inductive relation to a suitable core and one of the windings being connected with a special core, forming a magnetic continuation of the first-named core. The coils referred to are connected in series and so wound that when they stand in the same plane the inductive drop is zero or approximately that. The effects are produced upon the circuit by the rotation of the movable coil or winding from one extreme position to another, during which rotation the apparatus as a whole passes from a condition of no inductance to maximum inductance or the reverse. The condition of no inductance represents the full-load position of the parts; that of maximum inductance the no-load position.

The mechanical force which controls the electrical forces in the circuit and the magnetic forces as well is in this instance represented by a divided counterweight operating through a rope or cord running over a pulley on the shaft to which the movable coil or winding is attached.

In the drawings, Figure 1 is a side elevation of the apparatus in full-load position. Fig. 2 is an end view of the same apparatus at full load. Fig. 3 is a detail view, and Fig. 4 is a diagram of the circuits.

The character 1 represents a movable coil or winding pivoted, by means of a shaft 2, in the standard 3 3. At full-load position the coil 1 is in the same plane with a fixed coil 5, secured in position by any suitable means, such as lips or flanges 6 6 on a yoke 7, secured to or formed on a pedestal 8. The yoke 7 and the flanges 6 are preferably made of some non-magnetic material, such as brass. The whole is supported on a base 9.

Both the fixed and the movable coils stand in inductive relation to a laminated core 10, a magnetic continuation of which is represented mounted within the movable coil 1 and adapted to rotate therewith. The movable coil, mounted as described, has with the section 11 a free rotation through approximately one hundred and eighty degrees, starting from the position illustrated in Fig. 1, in which position the current in the two windings or coils is in opposition. It will be understood that the coils 1 and 5 are connected in series and that in the position designated the inductive drop is zero or nearly zero. With the coils arranged in this manner there is a tendency for the movable coil or winding 1 to rotate away from the plane of the fixed winding on account of the electrical repulsion set up by the opposing currents. This tendency is controlled through the medium of a number of counterweights 12 12, held by a cord 13, which runs over a pulley 14 on the shaft 2.

As the movable coil or winding rotates away from the plane of the fixed coil or winding through the electrical repulsion set up by the opposing currents as the resistance of the main circuit is decreased by the cutting out of translating devices the inductive opposition of the coils decreases and a drop of voltage is set up at the terminals of the device. Up to the ninety-degree point the electrical repulsion grows less and less as the travel of the movable coil increases; but beyond this point the current begins to flow in the same direction, whereupon the rotation is continued under the influence of mutual attraction between the two coils. This continues until the position is reached where the movable coil is once more approximately in the plane of the fixed coil. The windings are now in unison, and the device shows a maximum drop of voltage.

On the end of the shaft 2 I loosely mount a lever 15, carrying an adjustable weight 16. The lever 15 is arranged to rest against a pin 17, set into the face of the pulley 14, as illustrated in the drawings. The force of the weight 16 is exerted against the force of the counterweights 12 12, the relation being such that the effect of the weight 16 gradually increases through a certain arc during this downward movement and then decreases to *nil*, when the pulley 14 has moved far enough to bring the pin 17 directly below its center or a little beyond. Beyond that point the opposition to the rotation of the coil 1 is derived wholly from the counterweights 12 12.

The practical effect of the weight 16 is to exert an auxiliary or assisting force in connection with the repulsive force which is first set up between the two coils. This force being, as has been explained, a gradually-decreasing force, the weight 16 is so arranged as to exercise a gradually-increasing force until such time as the force of attraction between the two coils begins to act. After this the weight 16 acts with a gradually-decreasing force until the entire action is placed under the control of the counterweights 12 12 on the one hand and the mutual attraction of the coils on the other.

By experimental calibration the value of the several parts of the divided counterweight opposing the movement of the coil can be determined and the value to be given to the weight 16, as will be readily understood by referring to the various modes of calibration explained in my patents of October 8, 1901.

Translating devices 4 4, such as arc-lamps in series, are included in the circuit of the coils 1 and 5, such translating devices being supplied by a suitable generator, as 41.

I claim as my invention—

1. In a system of electrical distribution, a number of translating devices in series and a coil in series therewith, in combination with a second coil and core, the arrangement being such that the first-named coil has a movement with relation to the second-named coil and core, means for supporting the movable coil so as to give it a capacity for changing its angular position with relation to the other coil, and graduated means for controlling such rotation.

2. In a system of electrical distribution, a circuit including translating devices in series and also including a pivoted coil in series with the translating devices, in combination with a fixed coil and core, means for permitting the rotation of the movable coil from a position of electrical opposition to the fixed coil to a position of unison therewith, and mechanical controlling means for such rotation.

3. A regulating device for electric circuits, consisting of a pair of relatively movable concentric coils, a divided core for the coils, one of the coils and one of the elements of the core being arranged at right angles to each other, and maintained on a common shaft, means for causing the movable coil to pass through a certain range of angular motion, and mechanical means for controlling the movement of the coil.

4. In a system of electrical distribution, a circuit including translating devices in series and also including a pivoted coil, in combination with a fixed coil, the two coils being in series with each other and the translating devices, means for permitting the rotation of the movable coil from a position of electrical opposition to the fixed coil to a position of unison therewith, a mechanical device opposing such movement, and a second mechanical device assisting such movement during a portion of the travel of the coil.

Signed at New York, in the county of New York and State of New York, this 28th day of November, A. D. 1902.

MALCOLM H. BAKER.

Witnesses:
WM. H. CAPEL,
GEORGE H. STOCKBRIDGE.